Nov. 11, 1941.                A. F. CONNERY                2,262,167
                       TELEGRAPH RECEIVING CIRCUIT
                          Filed Dec. 14, 1939
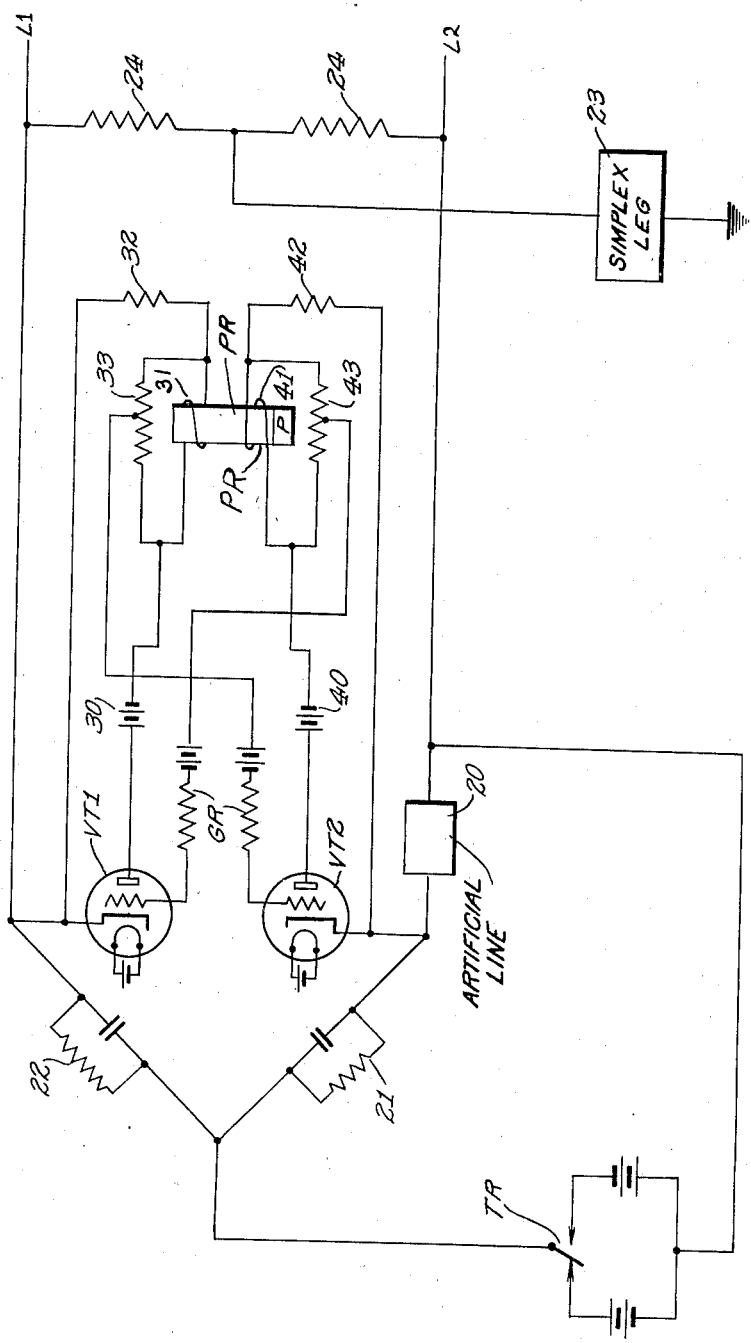
INVENTOR.
ALDER F. CONNERY
BY
ATTORNEY.

Patented Nov. 11, 1941

2,262,167

UNITED STATES PATENT OFFICE 2,262,167

TELEGRAPH RECEIVING CIRCUIT

Alder F. Connery, Brooklyn, N. Y., assignor to Postal Telegraph-Cable Company (New York), New York, N. Y., a corporation of New York Application December 14, 1939, Serial No. 309,169

3 Claims. (Cl. 178—60)

My invention relates to telegraph receiving circuits and more particularly to telegraph receivers which must be operated at high speed with small values of receiving currents at a minimum of signal distortion.

Telegraph receiving circuits utilizing direct current signalling impulses and provided with direct current vacuum tube amplifying arrangements have previously been suggested. In these types of systems it is quite common to arrange the amplifiers across the diagonal of a Wheatstone bridge with the transmitter across an opposite diagonal thereof, so that duplex operations may be achieved.

In these telegraph receiving arrangements it is desirable that the circuit be designed to operate at a high speed so that the rapid transmission of signals may be facilitated.

It is a principal object of my invention to provide a telegraph receiver utilizing vacuum tube amplifiers which will be capable of operating at a high speed with small values of receiving current.

It is a still further object of my invention to provide an amplifier receiver for telegraph systems utilizing a pair of vacuum tubes connected for direct current regenerative operation.

In accordance with one of the features of my invention, I provide a pair of vacuum tube amplifiers, the input circuits of which may be across the diagonal of a Wheatstone bridge circuit, the grid circuit of each of the vacuum tubes being connected in the plate circuit of the other vacuum tube, so that a regenerative operation is achieved.

Further, in accordance with another feature of my invention I may provide across the differential winding in the output of the amplifier, resistance elements for the purpose of speeding up the regenerative action of the system.

Other objects and features of my invention will become apparent from a particular description thereof made in connection with the accompanying drawing, the single figure of which illustrates a preferred embodiment of the receiver in accordance with my invention.

In the drawing the bridge type receiving circuit is shown, one arm of which comprises the transmission line and associated apparatus consisting of conductors $L_1$, $L_2$. An artificial line 20 serves as a second arm of the bridge, the other arms 21, 22, comprising resistance shunted condenser arrangements. Across one diagonal of the bridge is connected the transmitter arrangement indicated generally at TR. The receiver arrangement is then connected across the other diagonal of the bridge. As shown herein, a further simplexing arrangement may be provided utilizing lines $L_1$, $L_2$, as a single conductor by connecting a simplex circuit 23 to the midpoint of a resistor element 24 bridged across the line.

The receiver circuit comprises a pair of vacuum tube amplifiers $VT_1$ and $VT_2$, the output circuits of which are connected to differential windings on polar receiving relay PR. The cathode of tube $VT_1$ is connected to line $L_1$, and the plate circuit is connected to a separate plate battery 30, winding 31 of relay PR, resistance 32 to the cathode. Similarly, the plate circuit of vacuum tube $VT_2$ is connected to plate battery 40, winding 41 of relay PR, and resistance 42 to the cathode. The grid of tube $VT_1$ is connected to a grid resistor GR, a biasing battery to a point intermediate terminals of a resistor 43 arranged across winding 41, so that the grid of tube $VT_1$ is in the plate circuit path of tube $VT_2$. Similarly, the grid of tube $VT_2$ is connected to a grid resistance GR, biasing battery to an intermediate point on resistor 33 bridged across windings 31. Windings 31 and 41 are differentially arranged so as to control relays PR in opposite directions dependent upon which of the tubes $VT_1$ or $VT_2$ is energized.

Under normal conditions when no signal is being received, the grids of tubes $VT_1$ and $VT_2$ are so biased that a small current of equal amplitude flows in each of these tube circuits. Preferably this value is about one-half of the maximum value. Upon receipt of a signal over lines $L_1$, $L_2$, the bridge balance will be upset and a potential will exist across the diagonal thereof impressing a voltage across tubes $VT_1$, $VT_2$ of the amplifier. Depending upon the polarity of the received signals, one of the tubes will be biased negatively thereby and the other positively.

Assume for purposes of explanation that the incoming signal is such as to apply positive potential to the cathode of tube $VT_1$ and negative potential to the cathode of tube $VT_2$. Accordingly, the grid of tube $VT_1$ will become more negative with respect to the cathode, tending to cut down the current flow in the output winding 31, and simultaneously the grid of tube $VT_2$ will become more positive with respect to the cathode, increasing the current flow to winding 41. Because of the decreased flow of current through resistors 33 and 32, the grid of tube $VT_2$ will become still more positive and at the same time because of the increased output of tube $VT_2$ the current flowing to resistors 42 and 43 will make the grid of tube $VT_1$ still more negative. If the signal input is strong, tube $VT_1$ may be biased to cut-off. In order that the regenerative action may be controlled and not become too strong, grid resistors GR are provided. As soon as the grid of tube $VT_2$ becomes sufficiently positive to draw grid current the drop through the high resistor GR will serve to limit the current output.

It can thus be seen that a small potential difference applied across the input of the amplifier will cause a large amount of difference in the output of the tube because of the differential regenerative coupling. It is clear that this regenerative action as described, does not necessitate the bridging resistances 33 and 43 in the circuit, the resistances 32 and 42 being sufficient to supply the regenerative action.

Should signals arrive which cause opposite polarity of the potential on the input circuit of the amplifier, tube VT1 will become more conductive and tube VT2 less conductive, thus producing differential currents in windings 31, 41, so as to operate relay PR in the opposite direction.

The self-inductance of windings 31 and 41 is such as to tend to prevent rapid changes in plate current and for this reason at high speed the regenerative action just described may not be fully effective. In order to overcome this detrimental effect of the slow rise of current through the relay windings, I provide a circuit for utilizing the self-induced E. M. F. of the relay winding. Thus, very high resistances 33, 43 are bridged across windings 31, 41, respectively, the grid path from tubes VT1 and VT2 are connected at a point of resistors 43 and 33, respectively, so that only a fraction of the self-induced voltage of windings 31 and 41 is used. Thus a part of the voltage developed across the coil is utilized for biasing the grid of the opposite tube in response to the effect of the induced current to speed up the regenerative action of the system. In an actual construction of the apparatus, the tap was fixed at such a point as to utilize approximately one-quarter of the induced voltage.

It is clear that while the resistances 33 and 43 may tend to slow the positive operation of the relay due to the shunting of a portion of the current, still this effect may be in part overcome by the series resistance arrangement 32, 42. Furthermore, the additional regenerative action provided, more than compensates for any such slowing effect.

A circuit in accordance with the present invention as described above, in actual service shows that it is possible to operate at a much higher speed and with a greater margin over circuits where the received current is too small to directly actuate a receiving relay. Furthermore, another important advantage of this circuit is that the receiving relay is in a local circuit and its inductance, therefore, cannot in any way affect the distant artificial line balance.

While the circuit as shown in the drawing is described in connection with a metallic circuit, it is clear that a similar arrangement may be utilized over a single line ground return circuit. If such type of operation is desired, it is merely necessary that in place of return line L2, the circuit be grounded at artificial network 20, and that the common battery lead of transmitter TR also be grounded. When so used, of course, the simplexing arrangement cannot be utilized and must also be removed.

The arrangement as disclosed herein is suitable for use over long submarine cables, as well as land lines. Furthermore, the amplifier structure may be used without the bridge arrangement whenever a stable single stage direct current amplifier is required to produce a large current output from a small exciting voltage.

While I have described a specific embodiment of my invention, in conjunction with the illustration herein offered, it should be distinctly understood that this description is offered merely by way of explanation and is not to be considered as a limitation on the scope of the invention. What I consider to be my invention and upon which I desire to secure protection is embodied in the accompanying claims.

What I claim is:

1. A telegraph receiver comprising a pair of input terminals, means for applying signal potentials across said terminals, a pair of vacuum tubes each having cathode, grid and plate electrodes, said cathode electrodes being connected respectively to one of said terminals, plate circuits for said tubes comprising respectively differential windings and resistor elements connected between the plate and its corresponding cathode, high value resistors connected across said windings, and a connection from the grid electrode of each tube to a point in the plate circuit of the other tube between said corresponding plate electrode and winding, said point in the plate circuit being at an intermediate point on said high value resistors whereby the delay effects due to the inherent inductance of said windings is reduced and whereby upon receipt of signal potential a direct current regeneration occurs.

2. A telegraph receiver comprising a pair of input terminals, means for applying signal potentials across said terminals, a pair of vacuum tubes each having cathode, grid and plate electrodes, said cathode electrodes being connected respectively to one of said terminals, plate circuits for said tubes comprising respectively differential windings and resistor elements connected between the plate and its corresponding cathode, and a connection from the grid electrode of each tube to a point in the plate circuit of the other tube between said corresponding plate electrode and winding, whereby upon receipt of signal potential a direct current regeneration occurs, said telegraph receiver further comprising a two conductor signal line, a Wheatstone bridge arrangement of which said line constitutes one arm, and means for connecting said terminals to diagonally related points on said bridge arrangement whereby input signals on said line cause unbalance potentials across said terminals.

3. A telegraph receiver comprising a pair of input terminals, means for applying signal potentials across said terminals, a pair of vacuum tubes each having cathode, grid and plate electrodes, said cathode electrodes being connected respectively to one of said terminals, plate circuits for said tubes comprising respectively differential windings and resistor elements connected between the plate and its corresponding cathode, and a connection from the grid electrode of each tube to a point in the plate circuit of the other tube between said corresponding plate electrode and winding, whereby the self-induced electromagnetic force in the differential windings is utilized to accelerate the changes in potential of the grid electrodes, thereby reducing the delay effect due to the inherent inductance of said differential windings.

ALDER F. CONNERY.